Nov. 19, 1963 R. C. VICKERY 3,111,467
PRODUCTION OF SCANDIUM AND YTTRIUM
Filed June 3, 1960
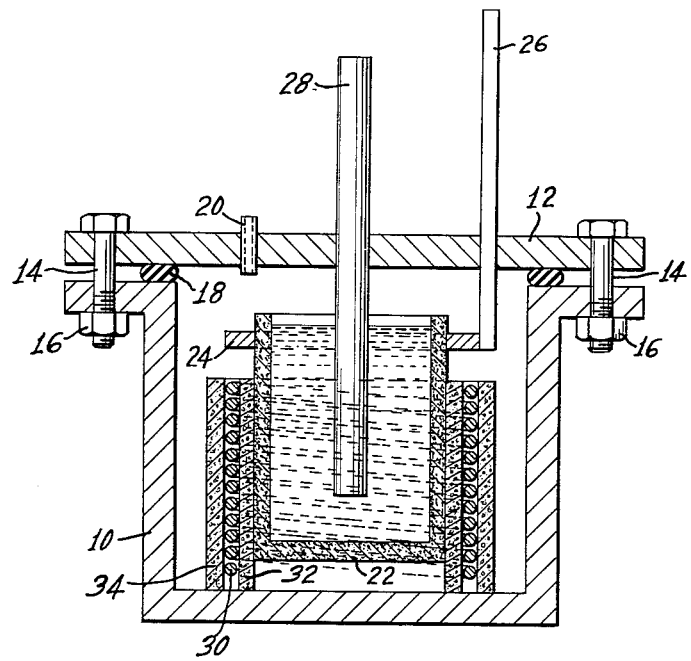
INVENTOR.
RONALD C. VICKERY
BY
ATTORNEYS United States Patent Office 3,111,467
Patented Nov. 19, 1963

3,111,467
PRODUCTION OF SCANDIUM AND YTTRIUM
Ronald C. Vickery, Malibu, Calif., assignor to Nuclear Corporation of America, Denville, N.J., a corporation of Delaware
Filed June 3, 1960, Ser. No. 33,767
14 Claims. (Cl. 204—64)

This invention relates to a method for producing metallic scandium and yttrium.

Heretofore, scandium and yttrium have been prepared by batchwise reduction of their halides using metallic calcium. This method involves numerous shortcomings, such as the fact that the resultant metal is heavily contaminated with tantalum from which it must be separated by vacuum distillation.

Consequently, there is a need for a method for producing scandium and yttrium metal which permits the preparation thereof in a continuous process on an industrial scale. One of the necessary requirements in such a method resides in the purity of the resulting metal to avoid subsequent steps of vacuum distillation or the like, as is the case with methods used heretofore.

It has been found, that sodium-scandium fluoride, having the formula $Na_3ScF_6$, has the property of dissolving scandium oxide, $Sc_2O_3$. Further tests have revealed that a molten solution of scandium oxide in sodium-scandium fluoride may successfully be used in the production of scandium by subjecting the fused solution to electrolysis. Electric current reduces scandium to the metallic state, which can be conveniently separated from the solution. In this regard it is noted that sodium-scandium fluoride exhibits a certain analogy to the corresponding aluminum double fluoride termed "cryolite" and employed in the production of aluminum metal according to a method known as the Hall-Héroult process. However, and the similarity between scandium and aluminum does not exclude distinct differences in other respects, a series of tests was required in order to establish that the method suggested herein is practical to the extent of permitting the production of scandium for industrial purposes.

While, in the foregoing paragraph, reference has been made to scandium, it has been found that the corresponding yttrium compounds give analogous results. For simplification, the following description is concerned mainly with the manufacture of scandium only, because the manufacture of yttrium may be conducted in a similar manner.

The method according to this invention includes the steps of electrically decomposing a molten electrolyte including scandium or yttrium oxide and alkali scandium double fluoride or the corresponding yttrium fluoride whereby a metal deposit is formed, which deposit is scandium or yttrium in a commercially pure state. The preparation of alkali double fluorides is known in the art but, to the present time, they have not been used in the production of the corresponding metal and the fact that they are able to dissolve the corresponding oxides was unknown.

The invention will be further illustrated by reference to the accompanying drawings in which the single FIGURE is a schematic sectional view of a small furnace adapted for use in connection with the method of this invention.

The furnace illustrated in the drawing includes an outer shell 10 provided with a cover 12 which is maintained in position by means of the bolts and nuts 14 and 16, respectively. A resilient gasket 18 arranged between the shell 10 and the cover 12 allows the furnace to be hermetically sealed. Through a small tube 20 the interior of the furnace may be evacuated and filled with an inert atmosphere such as helium, argon, or the like, to prevent undesirable reactions during electrolysis. A graphite crucible 22 is centrally mounted within the furnace and may be suspended by means of an annular holder 14 which, in turn, is suspended by the arm 26. Current is supplied by an axially arranged graphite electrode 28 passing through the cover 12 and extending into the crucible 22. The crucible is surrounded by a heating coil 30 which is suitably mounted between the two concentric walls 32 and 34 made of alumina cement. The inner wall 32 forms an insulation between the crucible 22 and the coil 30.

In the production of metallic scandium, a mixture of sodium fluoride and scandium fluoride is prepared, placed in the crucible and, upon connection of the heating coil 30 to a current supply (not shown), the mixture of NaF and $ScF_3$ is heated to the melting temperature of about 800° C. to form $Na_3ScF_6$. Subsequently, scandium oxide is added in the required quantity. It will be noted, that the double fluoride dissolves about 2% of its weight $Sc_2O_3$ and more may be added continuously as metal is deposited.

In order to effect electrolysis of the molten material in the crucible, electrical power is supplied between the central electrode 28 and the arm 26 which is electrically connected with the crucible 22 through the ring 24. It has been established that the heat energy required for maintaining the molten solution at the melting point of about 800° C. can be supplied by the electrolyzing current, so that heating by means of the coil 30 may be intermittent. When the electrolysis step is terminated, the crucible is removed from the furnace and allowed to cool. The cold reaction mixture is then crushed to obtain the metallic scandium granules which are dispersed throughout the mass.

In the following examples, the electrolytic production of scandium and yttrium, respectively, are described to better illustrate the invention.

*Example 1*

Initially, in order to produce $Na_3ScF_6$, 12.5 grams of sodium fluoride were mixed with 10.0 grams of scandium fluoride. The resulting mixture was placed in the crucible of a furnace as described above and heated to 800° for two hours. Subsequently, 0.45 gram of scandium oxide was added with stirring and dissolved in the molten fluoride.

After closing the furnace, the air was removed from the interior thereof through the tube 20 and a mixture of helium and argon was substituted therefor. The temperature of the scandium oxide solution in $Na_3ScF_6$ was again brought up to about 800° C., whereupon an electrolyzing current was applied to the molten mixture by connecting the central electrode 28 and the crucible 22, through ring 24 and an arm 26, to a current supply. Using a current of about 35 amperes, the voltage at the electrodes being 6 volts, the mixture in the crucible was subjected to electrolysis for 15 minutes, which represented 168% of the time theoretically required to deposit the amount of scandium available under these reaction conditions. During this time, the current through the coil 30 was shut off since the electrolyzing current supplied the heat necessary for maintaining the electrolyte in the molten state.

After electrolysis was terminated, the mixture was allowed to cool and was then crushed into small pieces to separate the formed metallic scandium. The yield was about 0.15 gram which amounts to about 50% of the theoretically calculated value.

*Example 2*

In accordance with this example, equivalent amounts of sodium fluoride are mixed with yttrium fluoride to prepare the corresponding double salt. As described in Example 1, yttrium oxide is dissolved in the molten salt and subject to electrolysis, under similar reaction conditions, to produce metallic yttrium.

In the foregoing, the method according to the invention has been described and illustrated in the drawing as applied to the production of small quantities and in a furname suitable for laboratory use. When manufacturing scandium or yttrium on an industrial scale, apparatus or equipment similar to that used in the Hall-Héroult process might be suitable. Then, and when applying the method of this invention to a continuous process, the fact that the electrolysis current supplies the heat required for maintaining the electrolyte in the molten state becomes important inasmuch as the heating coil may be omitted. Among the other advantages of large scale production is the fact that the formed metal accumulates in the bottom of the crucible, wherefrom it is removed from time to time by tapping or by siphoning. Additionally, the protective atmosphere used to avoid oxidation or nitridation of scandium (or yttrium) as described in the foregoing may be omitted, since the metal formed in the bottom of the furnace is practically hermetically enclosed by the molten electrolyte.

It will be obvious to those skilled in the art that many modifications may be made within the scope of the present invention without departing from the spirit thereof, and the invention includes all such modifications.

What is claimed is:

1. A method of producing a substantially pure metal selected from the group consisting of scandium and yttrium by electrolysis without the necessity of utilizing vacuum for purification which comprises electrolytically decomposing a molten electrolyte, the electrolyte consisting essentially of an oxide of a metal selected from the group consisting of scandium and yttrium dissolved in sodium double fluoride of the same metal, to form a substantially pure metallic deposit, and mechanically separating the deposit from the remaining electrolyte.

2. A method of producing substantially pure scandium by electrolysis without the necessity of utilizing vacuum for purification which comprises electrolytically decomposing a molten electrolyte, the electrolyte consisting essentially of scandium oxide dissolved in sodium scandium double fluoride to form a deposit of substantially pure metallic scandium, and mechanically separating the deposit from the electrolyte.

3. A method of producing substantially pure yttrium by electrolysis without the necessity of utilizing vacuum for purification which comprises electrolytically decomposing a molten electrolyte, the electrolyte consisting essentially of yttrium oxide dissolved in sodium yttrium double fluoride, to form a deposit of substantially pure metallic yttrium, and mechanically separating the deposit from the electrolyte.

4. A method of producing a substantially pure metal selected from the group consisting of scandium and yttrium by electrolysis without the necessity of utilizing vacuum for purification which comprises dissolving an oxide of a metal selected from the group consisting of scandium and yttrium in molten sodium double fluoride of the same metal to form a solution consisting essentially of said oxide and said double fluoride, subjecting the resulting molten solution to electrolysis by means of an electric current to form a substantially pure metallic deposit, and mechanically separating the deposit from the remainder of the solution.

5. A method of producing substantially pure scandium by electrolysis without the necessity of utilizing vacuum for purification which comprises dissolving scandium oxide in molten sodium scandium double fluoride to form a solution consisting essentially of said oxide and said double fluoride, subjecting the resulting molten solution to electrolysis by means of an electric current to form a deposit of substantially pure metallic scandium, and mechanically separating the deposit from the remainder of the solution.

6. A method of producing substantially pure yttrium by electrolysis without the necessity of utilizing vacuum for purification which comprises dissolving yttrium oxide in molten sodium yttrium double fluoride to form a solution consisting essentially of said oxide and said double fluoride, subjecting the resulting molten solution to electrolysis by means of an electric current to form a deposit of substantially pure metallic yttrium, and mechanically separating the deposit from the remainder of the solution.

7. In a process for producing a substantially pure metal selected from the group consisting of scandium and yttrium by electrolysis without the necessity of utilizing vacuum for purification, the steps of heating the sodium double fluoride of a metal selected from the group consisting of scandium and yttrium to at least the melting temperature thereof, dissolving an oxide of the same metal in the molten double fluoride to form a solution consisting essentially of said oxide and said double fluoride, applying an electric current to the resulting solution having a density and voltage sufficient for both maintaining it in the molten state and forming a deposit of substantially pure metal by electrolysis, and mechanically separating the deposited metal from the solution.

8. In a continuous process for producing a substantially pure metal selected from the group consisting of scandium and yttrium by electrolysis without the necessity of utilizing vacuum for purification, the steps of heating the sodium double fluoride of a metal selected from the group consisting of scandium and yttrium to at least the melting temperature thereof in a refractory vessel, dissolving an oxide of the same metal in the molten double fluoride to form a solution consisting essentially of said oxide and said double fluoride, applying an electric current to the resulting solution having a density and voltage sufficient for both maintaining the solution in the molten state and forming a deposit at the bottom of the vessel of substantially pure metal by electrolysis, supplying additional double fluoride and oxide at about the rate of electrolytic decomposition, and separating the deposited metal from the solution by removing the substantially pure metal from the bottom of the vessel while said solution is in the molten state, leaving the solution in the vessel.

9. A process for the production of substantially pure metallic scandium by electrolysis without the necessity of utilizing vacuum for purification which comprises heating sodium scandium double fluoride to at least the melting temperature thereof, dissolving scandium oxide in the molten double fluoride to form a solution consisting essentially of said oxide and said double fluoride, applying an electric current to the resulting solution having a density and voltage sufficient for both maintaining the solution in the molten state and forming a deposit of substantially pure metallic scandium by electrolysis, and mechanically separating the deposited metallic scandium from the solution.

10. A process for the production of substantially pure metallic yttrium by electrolysis without the necessity of utilizing vacuum for purification which comprises heating sodium yttrium double fluoride to at least the melting temperature thereof, dissolving yttrium oxide in the molten double fluoride to form a solution consisting essentially of said oxide and said double fluoride, applying an electric current to the resulting solution having a density and voltage sufficient for both maintaining the solution in the molten state and forming a deposit of substantially pure metallic yttrium by electrolysis, and mechanically separating the deposited metallic yttrium from the solution.

11. A method of producing a substantially pure metal selected from the group consisting of scandium and yttrium by electrolysis without the necessity of utilizing vacuum for purification including the steps of dissolving an oxide of a metal selected from the group consisting of scandium and yttrium in molten sodium double fluoride of the same metal to form a solution consisting essentially of said oxide and said double fluoride, subjecting the resulting molten solution to electrolysis by means of an electric current to form a substantially pure metallic deposit, maintaining said oxide double fluoride solution in the molten state by said electric current and mechanically separating said deposit from the remainder of the solution.

12. A method of producing a subsantially pure metal selected from the group consisting of scandium and yttrium by electrolysis without the necessity of utilizing vacuum for purification including the steps of dissolving an oxide of a metal selected from the group consisting of scandium and yttrium in molten sodium double fluoride of the same metal to form a solution consisting essentially of said oxide and said double fluoride, subjecting the resulting molten solution to electrolysis in a zone by means of an electric current to form a substantially pure metallic deposit, protecting said zone from the atmosphere and mechanically separating the deposit from the remainder of the solution.

13. A method of producing a substantially pure metal selected from the group consisting of scandium and yttrium by electrolysis without the necessity of utilizing vacuum for purification including the steps of dissolving an oxide of a metal selected from the group consisting of scandium and yttrium in molten sodium double fluoride of the same metal to form a solution consisting essentially of said oxide and said double fluoride, subjecting the resulting molten solution to electrolysis by means of an electric current to form a substantially pure metallic deposit, maintaining the surface of said mixture in contact with an atmosphere which is inert with respect to the electrolyte under reaction conditions and mechanically separating the deposit from the remainder of the solution.

14. A method of producing a substantially pure metal selected from the group consisting of scandium and yttrium by electrolysis without the necessity of utilizing vacuum for purification including the steps of mixing sodium fluoride with a fluoride of a metal selected from the group consisting of scandium and yttrium, heating said mixture to produce a molten sodium double fluoride of said metal, dissolving an oxide of said metal in the molten sodium double fluoride to form a solution consisting essentially of said oxide and said double fluoride, subjecting the resulting molten solution to electrolysis by means of an electric current to form a substantially pure metallic deposit and mechanically separating the deposit from the remainder of the solution.

References Cited in the file of this patent

UNITED STATES PATENTS

| | | |
|---|---|---|
| 1,815,054 | Driggs | July 21, 1931 |
| 1,905,866 | Heany | Apr. 25, 1933 |
| 2,961,387 | Slatin | Nov. 22, 1960 |

FOREIGN PATENTS

| | | |
|---|---|---|
| 560,235 | Great Britain | Mar. 27, 1944 |
| 562,777 | Great Britain | July 14, 1944 |

OTHER REFERENCES

Pascal: "Nouveau Traite De Chimie Mineral," Tome VII (1959), Q.D. 151 P 32, page 749.